May 9, 1967 P. BAUER ETAL 3,318,523
TIMING MECHANISMS
Filed Oct. 2, 1964 2 Sheets-Sheet 1

INVENTORS
PETER BAUER &
JOHN P. MORTON
BY Hurwitz & Rose
ATTORNEYS

INVENTORS
PETER BAUER &
JOHN P. MORTON
BY Hurvitz & Rose
ATTORNEYS

United States Patent Office 3,318,523
Patented May 9, 1967

3,318,523
TIMING MECHANISMS
Peter Bauer and John P. Morton, Bethesda, Md., assignors to Bowles Engineering Corporation, Silver Spring, Md., a corporation of Maryland
Filed Oct. 2, 1964, Ser. No. 401,066
23 Claims. (Cl. 235—201)

The present invention relates to timing mechanisms and, more particularly, to a timing mechanism which is simple, reliable, accurate over a widely variable range of time intervals and which has a relatively low power consumption.

The problem with which the present invention is concerned is one wherein a timing mechanism must be designed to be operated by relatively unskilled personnel and yet must be capable of being set to a high degree of accuracy while maintaining reliability and low power consumption. It was decided that, in order to maintain simplicity, a single rotatable ring would be employed to select the time interval. A single ring control, however, presents problems where the time interval to be selected is to be varied over a large range of times. For instance, if it is desired to vary the timing function over 180 seconds in one-tenth second steps, there must be provided eighteen hundred discrete intervals. It is apparent that the spacings between eighteen hundred settings or indications arrayed about a ring of relatively small size, for instance, of four or five inch circumference, would be extremely small and it is unlikely that the accuracy required, which in the present instance is ±0.1 seconds, could be maintained. It was determined that accuracy of this type requires a digital system which must, of necessity, have eighteen hundred discrete steps capable of being set with precision.

In accordance with a first feature of the present invention, it was decided to abandon the concept of setting the mechanism by means of a single rotation of a timing ring. In order to permit multiple rotations of the timing ring, a time indicator distinct from the ring must be provided. Also, the calibrations or settings on the time indicator must be correlated to rotation of the ring so as to achieve the desired accuracy.

The separation of the reading function from the ring is achieved in accordance with the invention by employing a relatively long length of tape driven through suitable gearing from the ring and inscribing on the tape the various time settings desired; that is, settings calibrated in eighteen hundred discrete steps. The inscriptions on the tape may be read through a window or the type of opening in the mechanism with the inscriptions caused to advance or to move relative to the viewing window by means of rotating the ring any number of times as determined by the gearing between the ring and the tape.

In order for the tape to also control the operating mechanisms, it may be provided with a series of discrete coded indications which are intelligible to the operating mechanisms. More particularly, the tape may be punched or perforated tape with the arrangements of holes representing the various timing intervals to be selected.

It is apparent that, by making the tape quite long and using an appropriate gearing, no difficulty is experienced in making the desired selection accurately. However, in a device with which the present invention is concerned, there is a space limitation and, therefore, there are limitations on the length of tape. In order to minimize the length of the tape while maintaining system accuracy; that is, accuracy of settings, a single-ring vernier arrangement is provided which is of the type employed in some types of television sets for selecting UHF channels. More particularly, there is provided an outer ring which operates as the vernier setting and an inner ring which is picked up by the vernier ring after approximately 360° of rotation of the vernier ring. When coupling occurs between the vernier and inner ring, the movement of the tape is quite rapid. However, when the vernier ring is backed off, the movement of the tape is quite slow and, therefore, precise settings of the position of the tape relative to the viewing ring may be achieved.

The problem of reliability was next considered and this introduced problems as between system logic and actual reading of the code on the tape. Electrical and mechanical reading can be unreliable, particularly under conditions of severe mechanical strain. Thus, it was decided that pure fluid systems would provide the most reliable type of operation in a system of this type. However, the difficulty with pure fluid systems is the power consumption problem. It was determined, however, that by employing a binary counting system, this requiring eleven stages to provide the requisite eighteen hundred discrete counts, a total of only approximately twenty-seven power nozzles would be required in the counting, decoding and presetting systems. The power consumption of twenty-seven nozzles associated with pure fluid amplifiers of a relatively small type was well within the power available in the system. More particularly, the binary system employs only eleven power nozzles in the binary counter section and the remaining nozzles are in the decoding and control sections. Another system which is not quite as good but also acceptable is a base-four counter, such as a counter requiring about sixty power nozzles.

It is an object of the present invention to provide a timing mechanism which may be set with a high degree of accuracy to a particular setting over a wide range of time settings by means of rotation of a single ring.

It is another object of the present invention to provide a timing mechanism employing pure fluid elements and a perforated tape for setting the desired time into the pure fluid timing system.

It is still another object of the present invention to provide a timing mechanism employing a directly readable perforated tape coded with all of the desired time settings and to provide a single rotatable ring for moving the tape to a position representing a desired time setting relative to both a viewing window and a time selection sensing mechanism.

It is yet another object of the present invention to employ a timing mechanism employing a pure fluid counter and pure fluid coding mechanism wherein selection of a specific time to be sensed by the decoding mechanism is made by means of a perforated tape employed to insert a present count into the pure fluid counter upon initiation of the timing interval or which may sense the various selected output channels from the counting mechanism.

The above and still further objects, features and advantages of the present invention will become apparent upon consideration of the following detailed description of one specific embodiment thereof, especially when taken in conjunction with the accompanying drawings, wherein.

Figure 1:
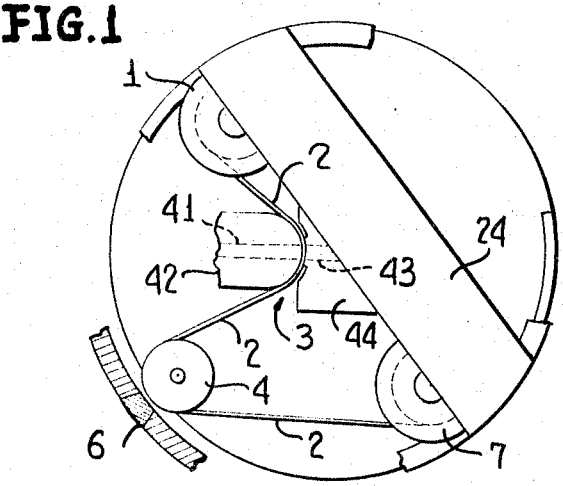
FIGURE 1 is a top view of the physical arrangement of the elements of the timing mechanism.

Referring specifically to FIGURE 1 of the accompanying drawings, there is schematically illustrated a tape feed, transporting, sensing and viewing mechanism for use in the apparatus of the present invention. More particularly, there is provided a spool 1 having wound thereon a perforated tape 2 having the perforations in coded form to represent desired time intervals. In addition, the tape is provided with a strip, which will be explained more fully with respect to FIGURE 2, with numbers imprinted thereon indicating the particular time interval of an associated code. The tape 2 proceeds from the spool 1 through a sensing mechanism generally designated by the reference numeral 3, which mechanism is employed to sense the hole pattern in each discrete location in the tape 2 and to utilize the information represented by these patterns to effect a timing function. The tape 2 thereafter passes over a roller 4 which is immediately behind a viewing window 6 through which the number designations on the tape 2 may be sensed. Thereafter, the tape 2 is directed to a take-up spool 7 onto which the tape is wound. Both spools 1 and 7 are rather heavily spring-biased so as to maintain the tape 2 taut in the system and thus insure accurate alignment as between the numbers seen through the window 6 and the holes, carrying the information represented by the numbers seen in the window, with the sensing mechanism 3.

It is immediately apparent that, in a system of this type, the numbers representing a particular time interval are displaced from the holes in the tape representing this interval by the distance between the sensing station and the viewing station.

Figure 2:
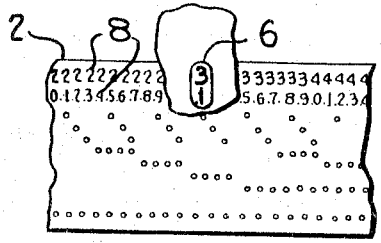
FIGURE 2 is an enlarged view of the perforated tape employed to select the timing interval.

For convenience, although it is not essential, the numbers printed on the tape, which are designated in FIGURE 2 by reference numeral 8, are arranged in several rows. The number in the upper row represents the one-second indications, whereas the number in the lower row represents the tenth-second indications. There are ten of the upper numbers of the same value for each group of numbers 0–.9 of the lower numbers. Further, there is one vertical column of one or more perforations, as viewed in FIGURE 2, corresponding to each of the numbers 8.

Figure 3:
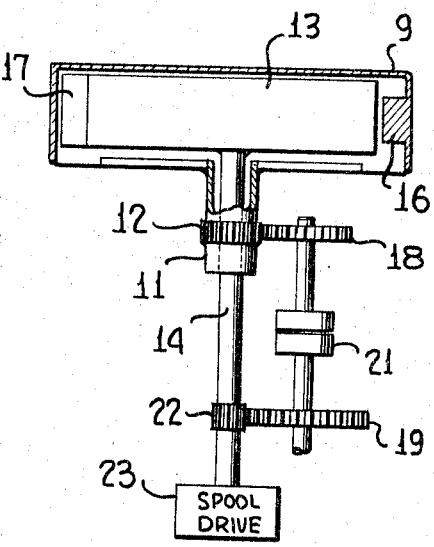
FIGURE 3 is a side view of the vernier arrangement for setting the perforated tape of FIGURE 2.

Referring now specifically to FIGURE 3 of the accompanying drawings, there is illustrated a type of vernier drive mechanism which may be employed with the apparatus of the present invention. The apparatus is basically conventional and comprises an outer ring 9 carried on a hollow shaft 11 having a gear 12 formed thereon. Interiorly of the ring 9 is a flat cylinder 13 carried on a rotatable shaft 14 which is coaxial of and disposed interiorly of the shaft 11. The ring 9 has an inwardly projecting shoulder 16 and the cylinder 13 has an outwardly projecting shoulder 17. The ring 9 and knob 13 are freely rotatable with respect to one another until the shoulder 16 contacts the shoulder 17 at which time continued rotation of the knob 9 in the direction which brought the two shoulders into contact causes the cylinder 13 to rotate with the ring 9.

The gear 12 on shaft 11 engages a gear 18 which drives a further gear 19 through a slip clutch 21. The gear 19 engages a gear 22 formed on the shaft 14. The shaft 14 may be coupled directly into the drive mechanism 23 for the spools 1 and 7. Upon rotation of the ring 9 before the shoulders 16 and 17 are brought into contact, the shaft 14 is driven via gears 18, slip clutch 21, gear 19 and gear 22. This is a step-down gearing mechanism so that the shaft 14 is driven at a considerably lesser rate of rotation than the ring 9, thus providing a vernier effect. When the shoulder 16 engages the shoulder 17 on the ring 13, the cylinder 13 rotates with the ring 9 and the shaft 14 is driven at a much greater rate of rotation than when driven through gears 18, 19, etc. The slip clutch 21 decouples the gear 18 from the gear 19 when the ring 9 rotates the cylinder 13, as is obviously required. Thus, with a single-ring arrangement, both a rather rapid rate of advancement of the tape is permitted where as by rotating the ring 9 in a direction such that the shoulders 16, 17 become disengaged, a much lesser rate of movement of the tape is permitted; this arrangement permitting accuracy of positioning of the tape without requiring a tape of extremely long length.

The spool drive gearing mechanism which is designated by the reference numeral 23 is actually carried on a plate 24 as viewed in FIGURE 1. The gearing from the shaft 14 to the spools 1 and 7 is through distinct one-way clutches so that, when the ring 9 is rotated in one direction, the spool 7 is driven to feed the tape off the spool 1 and, when the ring 9 is rotated in the other direction, the spool 1 is driven so as to take tape from the spool 7. In this way, direct drive of the tape in both directions, which is obviously required for precise positioning, is permitted. The mechanisms for accomplishing this type of drive are well known in the art and nothing would be served by describing them herein.

Figure 4:
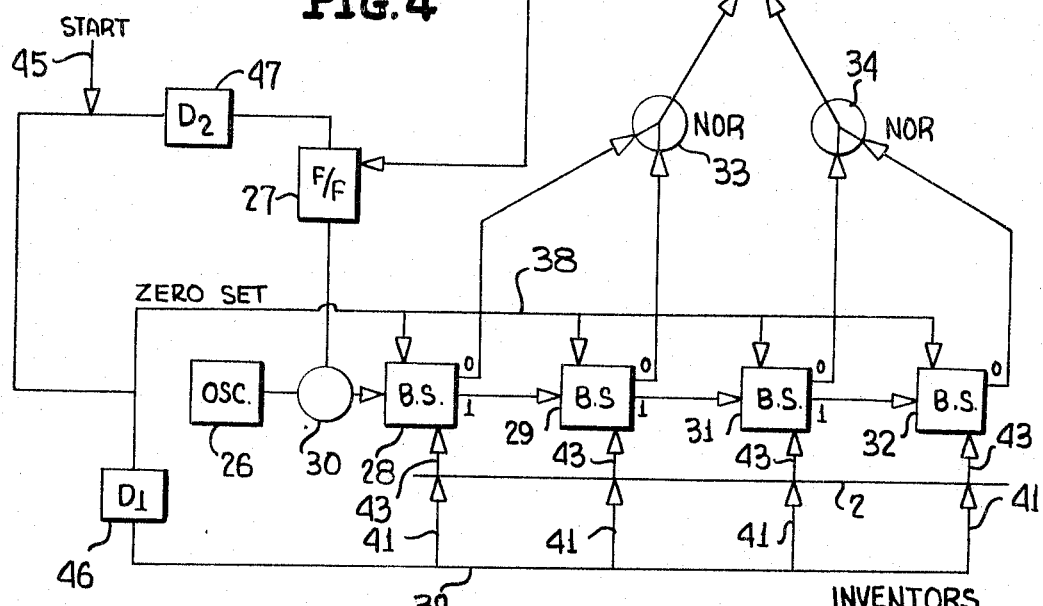
FIGURE 4 is a schematic diagram of the timing apparatus.

Referring now specifically to FIGURE 4 of the accompanying drawings, there is illustrated one system of timing which may be employed in the apparatus of the present invention. The basic timing function is provided by an oscillator 26 coupled through an and-gate 30, primed by a start flip-flop 27, to a first stage 28 of a binary counter which in the figure comprises only four counting stages. It should be noted that, in the device under discussion, eleven such stages should be employed. The binary stages employed may be of the type described in U.S. Patent No. 3,001,698 to Raymond W. Warren. The one's output signal from the binary stage 28 is coupled to the signal input passage of a second binary stage 29, this arrangement being followed through subsequent binary stages 31 and 32. The zero's output channel of the stages 28 and 29 are fed to a first nor-gate 33 and the zero's output channels of the stages 31 and 32 are fed to a second nor-gate 34. The output channels from the nor-gates 33 and 34 are fed to an and-gate 36. The output channel 37 of the and-gate 36 produces an output signal only when the counter has reached its maximum count. This results from the fact that, when the counter has reached maximum count, no signals are applied to either nor-gate 33 or 34 and thus, signals are applied to both input channels of and-gate 36. It should be noted that the nor-gates and and-gate may be of the type illustrated in U.S. Patent No. 3,016,066 to Raymond W. Warren and Billy M. Horton. Each of the binary stages 28, 39, 31 and 32 is provided with set and reset passages for initially setting the binary stage to one or a zero condition. Set and reset of binary stages of the Warren type are described in co-pending patent application Ser. No. 252,432, filed on Jan. 18, 1963, by John R. Colston, now U.S. Patent No. 3,244,370, and assigned to the same assignee as the present invention. Each of the set or zero set passages of the binary stages are connected to a common zero set passage 38. The apparatus is also provided with a one's reset channel 39, the channel 39 being connected to a series of reset passages 43 provided in each counter stage.

Referring again for the moment to FIGURE 1, one of the passages 41 is illustrated in dashed lines as passing through a head 42 having all of the passages 41 formed therein in the third dimension relative to the page; that is, in the dimension perpendicular to the plane of the drawing. Each of the passages 41 is aligned with a different reset passage 43. The passages 43 are formed in a block 44 which actually constitutes a stack of wafers in which the binary stages are formed.

The apparatus of FIGURE 4 is of the type in which an initial count is set into the binary counter, the count being equal to the difference between the desired count and the maximum count of the device. The maximum count of the apparatus illustrated in FIGURE 4 is fifteen. If it is desired to time for a period of ten seconds, then the binary counter is set to a count of five so that, upon receiving ten pulses from the oscillator 26, the counter obtains a maximum count of fifteen after ten cycles. When the counter reaches its maximum count, none of the zero's channels have fluid flow thereto. In consequence, fluid flows to both of the inputs to the and-gate 36 so that a fluid signal is developed on the output 37. It is apparent, of course, that the nor-gates could be replaced with or-gates and the and-gate replaced with a nor-gate to perform precisely the same function.

In order to provide for initial set of the counter to the desired count, the tape 2 is positioned between channels 41 and 43 and is provided with a coded array of apertures and no apertures such that the counter, upon the application of a fluid pulse to the channel 39, is preset to the desired count.

In operation, a fluid pulse is applied to a start passage 45 connected directly to the zero set passage 38. Thus, all of the binary stages are initially set to a zero count. The start passage 45 also feeds the reset channel 50 through a time delay 46, which may simply be an enlarged area in the passage, to provide a capacitive delay so that fluid is applied to the channel 39 after all of the stages are set to zero. The fluid supplied to passage 39 passes through channels 41 to the reset passages 43 selected by the perforations in the tape 2. Those binary stages which receive fluid via their reset passages 43 are set to the count of one and the system is thus ready for operation.

The start passage 45 is also connected to a start flip-flop 27 via a second delay 47 which is greater than the delay 46. Thus, at a predetermined time after the binary stage has been set to the selected count, the flip-flop 27 is switched so as to actuate and-gate 30 which now couples pulse signals generated in one output passage of the oscillator 26 to the binary counter which then counts at a rate determined by the frequency of oscillation of the oscillator.

As indicated above, the binary counter now counts to the count of fifteen in an interval determined by the initial setting of the counter and the frequency of oscillation of the oscillator and, when the counter reaches a count of fifteen and only upon this occurrence, a fluid signal is generated in the output passage 37 of the decoding mechanism. The fluid output signal on lead 37 may also be applied to flip-flop 27 to terminate counting by blocking and-gate 30.

Figure 5:
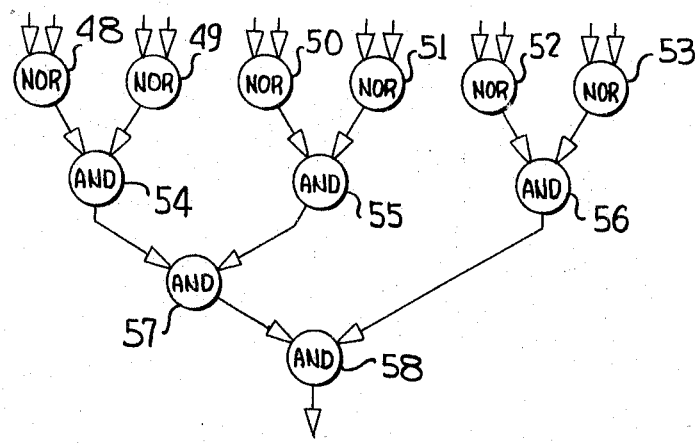
FIGURE 5 is a logic diagram of a first time recognition system.
Figure 6:
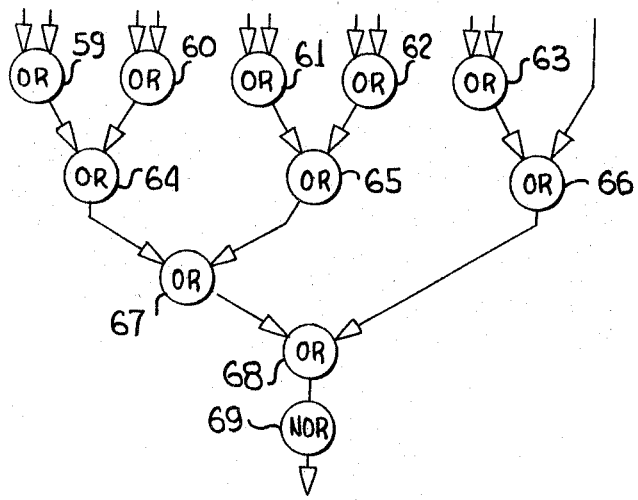
FIGURE 6 is a logic diagram of a second time recognition system.

As previously indicated, one object of the present invention is to reduce, so far as possible, the power consumption of the apparatus. The apparatus illustrated in FIGURE 4, when expanded to the full size of eleven binary stages, includes a total of eleven power nozzles in the binary counter, ten or eleven power nozzles in the decoding mechanism, depending upon whether a passive or active and-gate 36 is employed. In addition, there is a power nozzle in the oscillator and a power nozzle in the flip-flop 27. If the and-gate 30 is an active gate, another power nozzle is required. One additional power nozzle may be required to amplify the signal on the lead 37 in which case there are a total of twenty-three or twenty-six power nozzles depending upon the type of and-gates employed. By employing small elements, the power consumption of twenty-three or twenty-six power nozzles may be kept well within the required energy consumption requirements over the timing interval of 180 seconds; that is, three minutes. The total decoding system for an eleven stage counter is illustrated in FIGURE 5. The elements 48–53 are nor-gates while elements 54–58 are and-gates. If desired, all or-logic may be employed with a nor-gate output as illustrated in FIGURE 6. Specifically, the decoder employs ten or-gates 59–68 and a nor-gate 69 as the output element. An advantage of the two systems illustrated is that they operate from the zero's output channels so that none of the fluid in the one's channels required to drive successive counter stages is diverted to the decoder.

The system is quite reliable in operation since it is known that one of the basic advantages of pure fluid systems is their high degree of reliability. System operating simplicity has been maintained by the use of a single ring for setting the time interval into the mechanism, the ability to employ a single ring setting with accuracy resulting from the use of the type mechanism described in the particular manner employed herein. Accuracy, of course, is also achieved because of the method of employing the tape and because of the utilization of digital pulse techniques.

Figure 7:
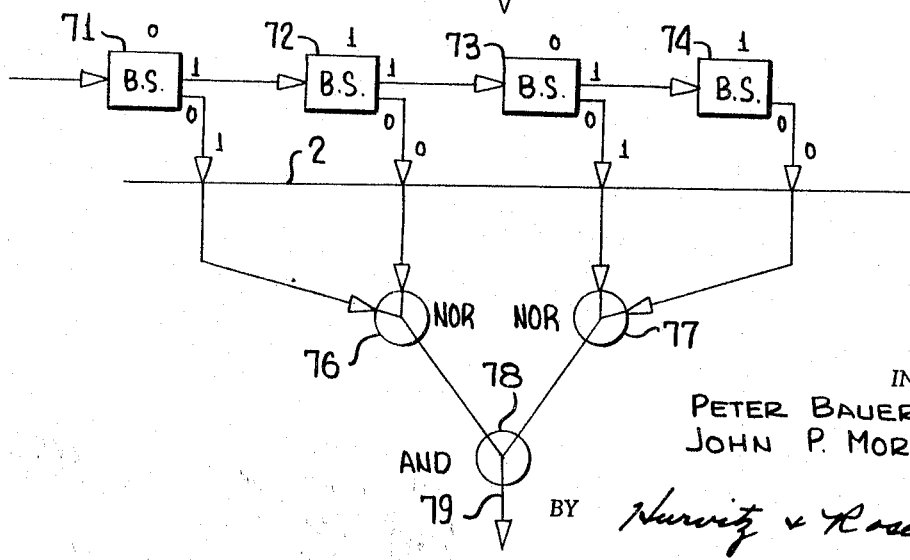
FIGURE 7 is a schematic diagram of a second timing apparatus.

The particular type of decoding arrangement employed in FIGURE 4 is not, of course, the only type of system which may be employed with a perforated tape. For purposes of amplification, reference is made to FIGURE 7 in which there is again provided a four-stage binary counter driven from an oscillator through an and-gate, these latter two elements not being illustrated. The binary counter stages of FIGURE 7 are designated by reference numerals 71, 72, 73 and 74 in the order of their weight in the counting system with the counter stage having the least weight being designated by numeral 71. The zero's output of each of the binary stages is connected to an associated nor-gate through a tape sensing arrangement which is identical with that illustrated in FIGURE 1, the tape again being designated by the reference numeral 2 in FIGURE 7. The coding of the tape 2 may be simplified in this apparatus for reasons which will become apparent upon considering the following example: If it is desired to count to ten; for example, the binary stages read zero, one, zero, one for the stages 71–74, respectively, when this count is achieved. Reading the stages in the correct order, the designation for ten in binary number notation is 1010. By sensing the zero's output of the devices, it is only necessary to sense the output of the stages in the one's state; in the present example, the stages 72 and 74. This is true because the counter can only count in one direction and both of the stages 72 and 74 achieve a one indication for the first time in the counting operation at the number 10. The zero's output passage from the stage 74 has fluid supplied thereto until the counter reaches a count of eight. At the count of eight, all of the binary stages have fluid flowing in their zero's output passage except the last stage 74. Since, in the example, sensing does not occur on the stage 73, the tape 2 blocking the flow from 73 to the gate 77, the nor-gate 77 at this time develops an output to the and-gate 78. However, since fluid is flowing in the one's passage of the counter 72, the second nor-gate 76 does not direct fluid to its output passage and the and-gate 78 remains blocked. When the counter adds a count of two to the previous count of eight in establishing a count of ten, fluid no longer flows through the zero's output passage of the stages 72 and, since stage 71 is not being sensed, the nor-gate 76 now develops an output signal. The and-gate 78 now develops an output signal in its output passage 79, thus indicating that the counter has reached the proper count. It is apparent that, because the counter of FIG- URE 7 can only count in one direction, suitable coding which is relatively simple may be provided over a range of eighteen hundred patterns of outputs of the counters.

While we have described and illustrated one specific embodiment of our invention, it will be clear that variations of the details of construction which are specifically illustrated and described may be resorted to without departing from the true spirit and scope of the invention as defined in the appended claims.

What we claim is:

1. A timing mechanism comprising an indefinite length of perforated tape, said tape having a plurality of time indicia each representing a different time interval, said indicia being in the form of patterns of perforations in said tape and being arranged serially along the length of said tape, a supply means for storing said tape, a take-up means for receiving said tape, a sensing station arranged along the path of said tape for sensing the indicia on said tape, means for feeding the tape from said supply means to said take-up means so as to present different indicia to said sensing station, means for providing time indicia signals representative of the time indicia present at said sensing station, selectivity actuable timing means for producing an output signal upon the lapse of a predetermined time interval, control means for actuating said selectively actuable timing means, means responsive to said time indicia signals for determining said predetermined time interval, a viewing station disposed along the path of said tape, visual indicia disposed along said tape with each visual indicia providing a visual indication of a time interval represented by a dfferent one of said plurality of time indicia, said visual indicia being spaced along the length of said tape from its corresponding time indicia by the distance between said sensing and viewing stations.

2. A timing mechanism comprising an indefinite length of perforated tape, said tape having a plurality of time indicia each representing a different time interval, said indicia being in the form of patterns of perforations in said tape and being arranged serially along the length of said tape, a supply means for storing said tape, a take-up means for receiving said tape, a sensing station arranged along the path of said tape for sensing the indicia on said tape, means for feeding the tape from said supply means to said take-up means so as to present different indicia to said sensing station, means for providing time indicia signals representative of the time indicia present at said sensing station, selectively actuable timing means for producing an output signal upon the lapse of a predetermined time interval, control means for actuating said selectively actuable timing means, means responsive to said time indicia signals for determining said predetermined time interval, a rotatable ring, gear means for coupling said ring to said means for feeding, said gear means having a gear ratio such that more than one revolution of said ring is required to feed said tape through its entire length.

3. The combination according to claim 2 wherein the gear ratio of said gear means is such that at least a five degree rotation of said ring is required to move the tape through ten indicia.

4. The combination according to claim 3 wherein the gear ratio of said gear means is such that at least five degrees of rotation of said rotatable ring are required to move said tape through 2.5 inches of travel.

5. The combination according to claim 2 further comprising a viewing station disposed along the path of said tape, visible indicia disposed along said tape with each visual indicia providing a visual indication of a time interval represented by a different one of said plurality of time indicia, said visual indicia being spaced along the length of said tape from its corresponding time indicia by the distance between said sensing and viewing stations.

6. The combination according to claim 5 wherein the gear ratio of said gear means is such that at least a five degree rotation of said ring is required to move the tape through ten indicia.

7. A timing mechanism comprising an indefinite length of perforated tape, said tape having a plurality of time indicia each representing a different time interval, said indicia being in the form of patterns of perforations in said tape and being arranged serially along the length of said tape, a supply means for storing said tape, a take-up means for receiving said tape, a sensing station arranged along the path of said tape for sensing the indicia on said tape, means for feeding the tape from said supply means to said take-up means so as to present different indicia to said sensing station, said sensing station including means for blowing a fluid against said tape and means responsive to the pattern of streams of fluid passing through said tape, for determining the time interval represented by said pattern of perforations.

8. The combination according to claim 7 wherein said means for determining comprises a counter having a plurality of stages, and means for inserting an initial count into said counter in accordance with the pattern of streams of fluid passing through said tape.

9. The combination according to claim 7 comprising means for stepping said counter after a preset count has been inserted therein and means for determining when said counter has counted out.

10. The combination according to claim 9 wherein said counter is a pure fluid counter comprising a plurality of pure fluid counter stages, each of said stages having a set input passage for placing a predetermined count into said stage in response to application of fluid flow thereto, and means for directing each stream of fluid passing through said tape to a set input passage of a different predetermined counter stage.

11. A timing mechanism comprising an indefinite length of perforated tape, said tape having a plurality of time indicia each representing a different time interval, said indicia being in the form of patterns of perforations in said tape and being arranged serially along the length of said tape, a supply means for storing said tape, a take-up means for receiving said tape, a sensing station arranged along the path of said tape for sensing the indicia on said tape, means for feeding the tape from said supply means to said take-up means so as to present different indicia to said sensing station, said sensing station including a counter having a plurality of stages each of said stages having at least one signal output circuit, a decoding network for producing an output signal when a predetermined pattern of signals is applied thereto, said tape being interposed between said decoding network and each of said signal output circuits of said counter stages so that when the pattern of signals at said signal output circuit conforms to said patterns of perforations on said tape at said sensing station said predetermined pattern of signals is applied to said decoding network.

12. The combination according to claim 11 wherein said counter is a pure fluid counter and wherein said signal output circuits are passages, fluid flow being directed to each passage when its associated counter stage has achieved a predetermined count, and wherein said decoding network is a pure fluid decoding network, said decoding network producing an output fluid flow when the pattern of fluid flows from said passages corresponds to the pattern of perforations in said tape for a particular indicia.

13. The combination according to claim 12 further comprising a viewing station disposed along the path of said tape, visible indicia disposed along said tape with each visual indicia providing a visual indication of a time interval represented by a different one of said plurality of time indicia, said visual indicia being spaced along the length of said tape from its corresponding time indicia by the distance between said sensing and viewing stations.

14. The combination according to claim 13 further comprising a rotatable ring, gear means for coupling said ring to said means for feeding, said gear means having a gear ratio such that more than one revolution of said ring is required to feed said tape through its entire length.

15. The combination according to claim 14 wherein the gear ratio of said gear means is such that at least a five degree rotation of said ring is required to move the tape through ten indicia.

16. The combination according to claim 15 further comprising a rotatable vernier ring, a second gear means for coupling said vernier ring to said means for feeding, said second gear means moving said tape a lesser distance per degree of rotation thereof than said rotatable ring.

17. The combination according to claim 1 wherein said timing mechanism is arranged in a cylindrical body and wherein said means for feeding includes a ring rotatable about the longitudinal axis of said body, first means for rapidly actuating said take-up means, second means for slowly actuating said take-up means, and means for operating said second means over a predetermined arc of rotation of said ring operating said first means upon rotation of said ring in excess of said predetermined arc.

18. The combination according to claim 1 wherein said visual indicia are arranged in rows parallel to the direction of movement of said tape, one of said rows containing visual indicia of a first specified unit of time and the others of said rows containing visual indicia of specific units of time which are multiples of said first specified unit of time.

19. A timing mechanism comprising a pure fluid counter having a plurality of pure fluid counter stages, each of said stages having a set input passage means for placing a predetermined count into said stage in response to application of fluid flow thereto, a sensing station having a plurality of fluid flow passages, means for presenting to said station a perforated member having at least one group of perforated regions located relative the portion of said fluid flow passages in said sensing station such as to define a specified time interval, said sensing station developing a pattern of fluid signals in said fluid flow passages as determined by the pattern of perforations in the perforated member, means coupling said fluid flow passages to said set input passage means of said counter to develop a count therein as determined by the pattern of perforations presented to said sensing station, means for stepping said counter and a decoding means for sensing the count in said counter, said decoding means including means for generating a signal when said counter obtains a specified count.

20. A timing mechanism comprising an indefinite length of perforated tape, said tape having a plurality of time indicia each representing a different time interval, said indicia being in the form of patterns of perforations in said tape and being arranged serially along the length of said tape, a supply means for storing said tape, a take-up means for receiving said tape, a sensing station arranged along the path of said tape for sensing the indicia on said tape, means for feeding the from said supply means to said take-up means so as to present different indicia to said sensing station, a rotatable ring, gear means for coupling said ring to said means for feeding, said gear means having a gear ratio such that more than one revolution of said ring is required to feed said tape through its entire length and such that at least a five degree rotation of said ring is required to move the tape through ten indicia, a viewing station disposed along the path of said tape, visible indicia disposed along said tape with each visual indicia providing a visual indication of a time interval represented by a different one of said plurality of time indicia, said visual indicia being spaced along the length of said tape from its corresponding time indicia by the distance between said sensing and viewing stations, a rotatable vernier ring, a second gear means for coupling said vernier ring to said means for feeding, said second gear means moving said tape a lesser distance per degree of rotation thereof than said rotatable ring.

21. A timing mechanism comprising an indefinite length of perforated tape, said tape having a plurality of time indicia each representing a different time interval, said indicia being in the form of patterns of perforations in said tape and being arranged serially along the length of said tape, a supply means for storing said tape, a take-up means for receiving said tape, a sensing station arranged along the path of said tape for sensing the indicia on said tape, means for feeding the tape from said supply means to said take-up means so as to present different indicia to said sensing station, a rotatable ring, gear means for coupling said ring to said means for feeding, said gear means having a gear ratio such that more than one revolution of said ring is required to feed said tape through its entire length, a rotatable vernier ring, a second gear means for coupling said vernier ring to said means for feeding, said second gear means moving said tape a lesser distance per degree of rotation thereof than said rotatable ring.

22. A timing mechanism comprising an indefinite length of perforated tape, said tape having a plurality of time indica each representing a different time interval, said indicia being in the form of patterns of perforations in said tape and being arranged serially along the length of said tape, a supply means for storing said tape, a take-up means for receiving said tape, a sensing station arranged along the path of said tape for sensing the indicia on said tape, means for feeding the tape from said supply means to said take-up means so as to present different indicia to said sensing station, a rotatable ring, gear means for coupling said ring to said means for feeding, said gear means having a gear ratio such that more than one revolution of said ring is required to feed said tape through its entire length and such that at least a five degree rotation of said ring is required to move the tape through ten indicia, a rotatable vernier ring, a second gear means for coupling said rotatable vernier ring to said means for feeding, said second gear means having a gear ratio such that said vernier ring moves said tape through one indicia for at least each five degrees of rotation of said vernier ring.

23. A timing mechanism comprising an indefinite length of perforated tape, said tape having a plurality of time indicia each representing a different time interval, said indicia being in the form of patterns of perforations in said tape and being arranged serially along the length of said tape, a supply means for storing said tape, a take-up means for receiving said tape, a sensing station arranged along the path of said tape for sensing the indicia on said tape, means for feeding the tape from said supply means to said take-up means so as to present different indicia to said sensing station, a viewing station disposed along the path of said tape, visible indicia disposed along said tape which each visual indicia providing a visual indication of a time interval represented by a different one of said plurality of time indicia, said visual indicia being spaced along the length of said tape from its corresponding time indicia by the distance between said sensing and viewing stations, said timing mechanism being arranged in a cylindrical body, wherein said means for feeding includes a ring rotatable about the longitudinal axis of said body, first means for rapidly actuating said takeup means, second means for slowly actuating said take-up means, and means for operating said second means over a predetermined arc of rotation of said ring operating said first means upon rotation of said ring in excess of said predetermined arc, and wherein said visual indicia are arranged in rows parallel to the direction of movement of said tape, one of said rows containing visual indicia of a first specified unit of time and the others of said rows containing visual indicia of specific units of time which are multiples of said first specified unit of time.

References Cited by the Examiner

UNITED STATES PATENTS

| | | | |
|---|---|---|---|
| 804,822 | 11/1905 | Ball | 84—151 |
| 1,194,811 | 8/1916 | Billings | 84—165 |
| 1,317,201 | 9/1919 | Laubach | 84—150 |
| 1,413,293 | 4/1922 | Scott | 84—165 |
| 2,220,474 | 11/1940 | Bryce | 95—4.5 |
| 2,531,885 | 11/1950 | Mills et al. | 235—61.12 X |
| 2,736,017 | 2/1956 | Marlowe et al. | 235—132 |
| 2,784,392 | 3/1957 | Chaimowicz | 235—61.12 X |
| 2,929,251 | 3/1960 | Broadhead et al. | 74—10.5 X |
| 3,010,425 | 11/1961 | Peavey | 116—135 |
| 3,093,306 | 6/1963 | Warren | 235—201 |
| 3,147,061 | 9/1964 | Walker et al. | 235—132 X |
| 3,191,008 | 6/1965 | Wadey | 235—201 |
| 3,191,858 | 6/1965 | Sowers | 235—201 |
| 3,193,197 | 7/1965 | Bauer | 235—201 |

OTHER REFERENCES

Aizerman: New Developements in Pneumatic-Hydraulic Automation, TJ 840 A5, January 2, 1964, pages 24–36.

RICHARD B. WILKINSON, *Primary Examiner.*

LEO SMILOW, W. F. BAUER, *Assistant Examiners.*